Patented Mar. 9, 1943

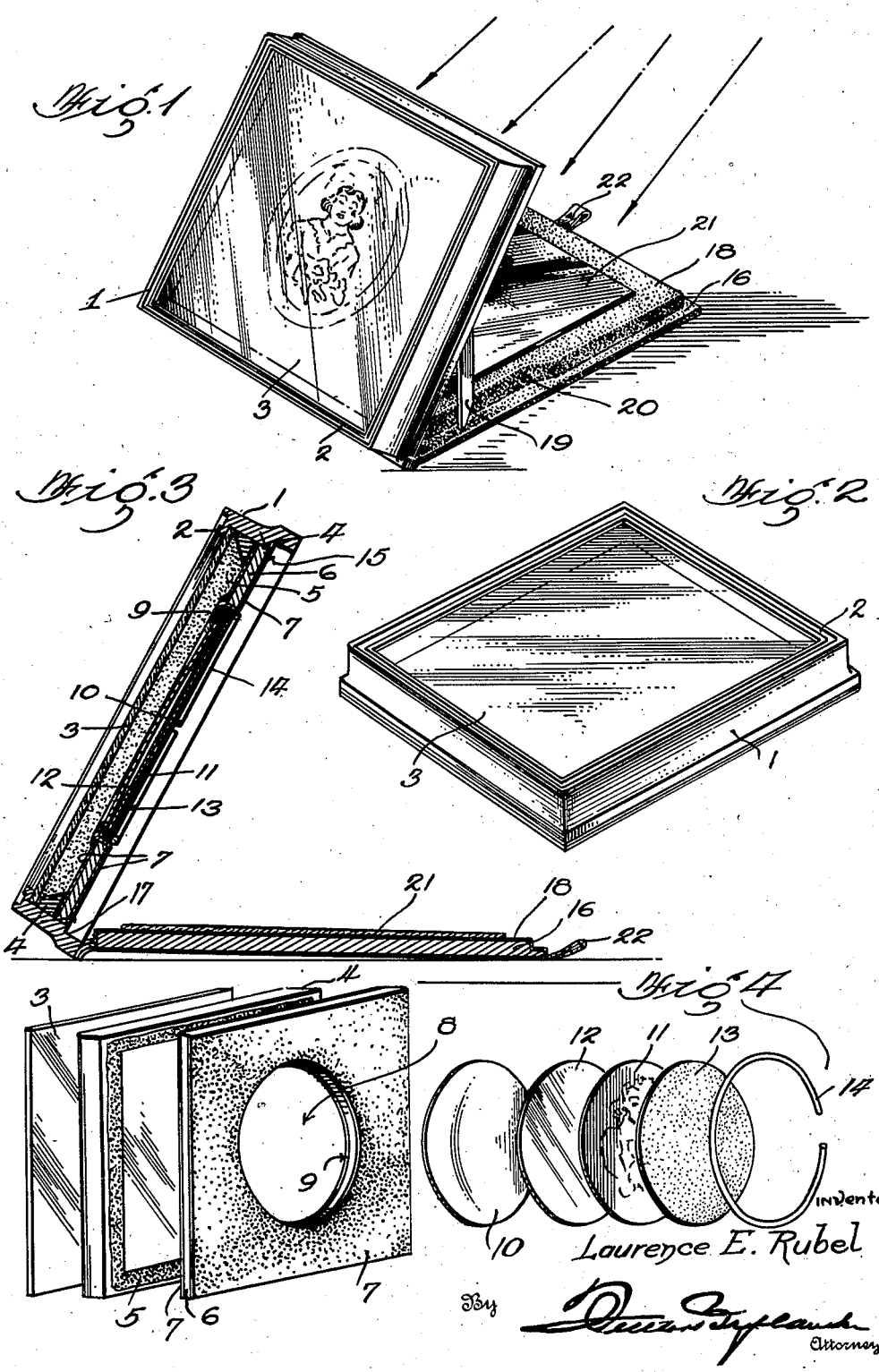

2,313,453

UNITED STATES PATENT OFFICE 2,313,453

DEVICE FOR VIEWING TRANSPARENCIES

Laurence E. Rubel, Washington, D. C., assignor to Underwood and Underwood, Washington, D. C., Inc., Washington, D. C.

Application June 20, 1941, Serial No. 399,036

2 Claims. (Cl. 40—152.2)

My invention relates to new and useful improvements in transparencies and more particularly to a new and improved means and method for displaying the same, the primary object of the invention being to provide a device for displaying transparencies so as to give the effect substantially of miniatures.

A further object of the invention resides in the provision of a frame for supporting the transparency permanently, with means in association therewith for the reflection of light therethrough.

Still another object of the invention resides in providing a frame for a transparency with a base member hinged thereto constituting a rear closure for the frame, when the transparency is not to be displayed, and forming a support for said frame and a light reflecting element when said transparency is to be viewed.

A still further object resides in providing a device of the character mentioned which will permit the transparency to be viewed at will and which is so constructed as to preserve said transparency against wear and tear from use or action of extraneous elements.

A still further object resides in providing a device which is simple and durable in construction, comparatively inexpensive to manufacture and one which will be very efficient in use.

With these and numerous other objects in view, my invention consists in the novel features of construction, combination and arrangement of parts as will be hereinafter referred to and more particularly pointed out in the specification and claims.

In the accompanying drawing, forming a part of this application

Figure 1 is a perspective view of my improved device in open position for the viewing of the transparency, the direction from which the source of light projects being indicated by arrows, Figure 2 is a similar view in closed position, Figure 3 is a vertical section through the device in open position, and Figure 4 is a disassembled perspective view of the various elements removed from the main frame of the device, showing the relationship of the elements to one another.

Various devices have been produced from time to time for the displaying and viewing of transparencies, but none appears to have been produced for permanently housing a transparency and employing the housing as an ornament for use on a table, desk or other similar structure, whereby the transparency may be viewed at will. Nor has there been heretofore produced a device of this character which may be utilized in lieu of a miniature. Miniatures are frequently displayed as ornaments on tables, desks or walls, but they are costly to produce and, moreover, require the holding thereof most frequently in a position to permit light to be reflected thereon for proper observation. My invention contemplates the provision of a device which will enable a transparency to be used in place of a costly miniature but which when placed forward of a light will permit said transparency to be readily viewed and beautifully displayed.

In describing the invention, I shall refer to the drawing, in which similar reference characters designate corresponding parts throughout the several views and in which the numeral 1 designates a deep frame, which constitutes the main frame of the device, the front portion of the frame being provided with a rearwardly facing shoulder 2 against which abuts the glass panel 3. Fitting within the frame 1 and abutting the rear face of the glass panel 3 is the auxiliary frame 4, the front face of which and the inner peripheral edges thereof are covered with plush, silk or other materials 5. Also mounted within the main frame 1 and abutting the rear face of the inner frame 4, is a mounting board 6, the front and rear faces of which are covered, as shown at 7, with plush, silk or other materials, similar to that used on the inner frame and designated by the numeral 5.

This mounting board 6 has an opening 8 formed therein, which in the drawing is shown oval in shape, although not necessarily limited to that design, and fitting snugly within said opening is an ornamental frame 9, formed of metal or any other material. The bead or flange of said frame 9 fits against the outer face of the mounting board 6, as clearly shown in Figure 3 of the drawing, and a rearwardly facing shoulder on said frame forms an abutment against which rests a glass panel 10, through which the transparency hereinafter referred to may be readily viewed. The transparency, which is designated in the drawing by numeral 11, may be of any desired material and bears a colored image. While I do not wish to be limited thereto, I have found that the photographing of an image on a direct positive film and the treatment of the same to produce color, such as is done on a conventional and well known type of film, will produce the character of transparency that is most desirable in connection with this device. The transparency is cut to fit within the frame 9 and for the protection thereof on the front face, I provide a transparent sheet 12, which may be Celluloid or other similar material. For the protection of the rear face of the transparency 11, I provide an additional transparent sheet 13, the forward face of which, that is, the face contacting the transparency 11, is grained or similarly treated to enable the light transmitted therethrough to be evenly distributed or diffused.

The transparency 11, together with the protective elements 12 and 13, are preferably secured together in any desired manner so that same may be introduced to this device as a single element, or removed therefrom without danger of affecting the transparency. When these three elements, as a unit, are introduced in the mounting board, same will contact the rear face of the glass panel 10 held in the frame 9 and a spring metal retainer 14 is provided which is adapted to fit within the frame 9 to secure the elements in place, as clearly shown in Figure 3 of the drawing. The mounting board 6 with the transparency and adjunctive elements mounted thereon or therein, is adapted to be secured in place against the inner frame 4, within the main frame 1, through the medium of small tacks or the like 15.

A closure for the rear of the frame is provided in the form of a plate 16 having a raised portion thereon, offset from the edges, the latter portion being adapted to fit within the rear portion of the frame 1 to abut the outwardly facing shoulder 17 of the latter. This enables the projecting marginal edges of the plate 16 to fit against and abut the rear face of the frame 1. This plate 16 is covered with a plush, silk or other material 18 which extends beyond one edge of the plate and is secured, in any desired fashion, to the lower portion of the rear face of the frame 1 to form a hinge for the plate or closure 16. This plate or closure 16 when swung to its open position as shown in Figures 1 and 3 of the drawing, constitutes substantially a base or support for the frame, but in order to hold the frame in an upright position with respect to said plate, a pivoted arm 19 is provided on the frame 1 which is adapted to rest on the plate 16 when the arm is swung outwardly, as shown in Figure 1. This arm 19 is pivoted on the inner face of the frame 1 and in order to permit the raised portion of the plate or closure 16 to fit within said frame with the pivoted arm 19 therein, the adjacent edge of the raised portion is cut away slightly as shown at 20 in Figure 1 of the drawing.

The inner face of the closure or plate 16 has secured thereto a reflecting surface 21, such as a mirror. Thus, when the device is in opened position, as shown in Figure 1 of the drawing, and placed forward of a lamp or other light, the rays of light will be reflected from the surface 21 through the transparency to be readily displayed and viewed from the front of the frame. The image in color on the transparency will be beautifully displayed and give the effect of a miniature. The device in open position may be displayed on a table, desk or the like to be viewed by anyone passing the same, similar to the display of a picture or miniature. When display is not desired, it is only necessary to withdraw the supporting arm 19 and return the closure 16 to its position against the frame. The frame so closed may remain on the table, desk or the like as an ornament, although the transparency will, of course, not be properly displayed under such conditions. When it is desired to view the transparency, it is only necessary to withdraw the rear closure from the frame by grasping the flexible finger piece 22, which is secured to the free end of the plate 16, and permitting said closure to rest flat on the table or other structure, swing the arm 19 to its frame supporting position and place the device forward of a lamp so that the rays of light may be reflected from the surface 21 through the transparency.

From the foregoing description of my improved device, the method and means of constructing and displaying the device will be readily understood, and it will be seen that I have provided a simple, inexpensive and efficient means for carrying out the various objects of the invention.

While I have particularly described the elements best adapted to perform the functions set forth, it is to be understood that various changes in form, proportion and in the minor details of construction may be resorted to, without departing from the spirit or sacrificing any of the principles of the invention.

What I claim is:

1. A device for viewing transparencies comprising a main frame open at its front and rear and having an internal shoulder about its front, a glass panel in the main frame having its margins bearing against the shoulder, an auxiliary frame within the main frame bearing against the panel back of the shoulder, a mounting board in the main frame held in spaced relation to the glass panel by the auxiliary frame and formed with an opening, an ornamental frame fitting snugly into the opening of the mounting board, a transparency and front and rear transparent protecting sheets for opposite faces of the transparency removably mounted in the ornamental frame, a rear closure for the main frame hinged at its lower edge to the lower edge of the main frame for swinging movement rearwardly and downwardly from a closed position to a reclining opened position in which it constitutes a base for the main frame, and a mirror carried on the inner surface of the closure adapted to reflect light from a source through the transparency when the closure is in its opened position.

2. A device for viewing transparencies comprising a main frame open at its front and rear, a glass panel in the main frame adjacent the front thereof, a mounting board in the main frame spaced rearwardly from the glass panel and formed with an opening, a transparency mounted in the opening, a rear closure for the main frame hinged at its lower edge to the lower edge of the main frame and having a thickened portion fitting snugly within the rear portion of the main frame when the closure is in a closed position, a side edge of the thickened portion being recessed for a portion of its length from the hinged end of the closure, a prop for supporting the main frame upright pivoted at one end to a side of the main frame in position to fit within the recess when the closure is closed and have its lower free end rest upon the closure within the recess when the closure is opened, and a mirror upon the inner surface of the closure to reflect light through the transparency when the closure is opened and the main frame upright.

LAURENCE E. RUBEL.